(12) United States Patent
Zhai et al.

(10) Patent No.: US 8,904,309 B1
(45) Date of Patent: Dec. 2, 2014

(54) PREDICTION COMPLETION GESTURE

(75) Inventors: Shumin Zhai, Los Altos, CA (US);
Yang Li, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 418 days.

(21) Appl. No.: 13/303,510

(22) Filed: Nov. 23, 2011

(51) Int. Cl.
*G06F 3/02* (2006.01)

(52) U.S. Cl.
USPC ............ 715/816; 715/780; 715/773; 715/863

(58) Field of Classification Search
CPC .......................... G06F 3/0237; G06F 3/04886
USPC .......................... 715/816, 780, 773, 764, 863
See application file for complete search history.

(56) References Cited

U.S. PATENT DOCUMENTS

| | | | |
|---|---|---|---|
| 7,152,213 B2* | 12/2006 | Pu et al. ........................ | 715/812 |
| 7,941,760 B2* | 5/2011 | Kocienda et al. ............. | 715/773 |
| 2003/0067495 A1* | 4/2003 | Pu et al. ........................ | 345/811 |
| 2007/0016862 A1* | 1/2007 | Kuzmin ........................ | 715/700 |
| 2007/0061753 A1* | 3/2007 | Ng et al. ....................... | 715/816 |
| 2007/0074131 A1* | 3/2007 | Assadollahi .................. | 715/816 |
| 2008/0082934 A1* | 4/2008 | Kocienda et al. ............. | 715/773 |
| 2008/0168366 A1* | 7/2008 | Kocienda et al. ............. | 715/764 |
| 2008/0259022 A1* | 10/2008 | Mansfield et al. ............ | 345/156 |
| 2008/0310723 A1* | 12/2008 | Manu et al. ................... | 382/182 |
| 2009/0174667 A1* | 7/2009 | Kocienda et al. ............. | 345/169 |
| 2010/0241984 A1* | 9/2010 | Nurmi et al. .................. | 715/773 |
| 2011/0154390 A1* | 6/2011 | Smith ............................ | 725/32 |
| 2011/0202876 A1* | 8/2011 | Badger et al. ................. | 715/816 |
| 2011/0242059 A1* | 10/2011 | Pasquero et al. ............. | 345/177 |
| 2012/0092278 A1* | 4/2012 | Yamano ........................ | 345/173 |

* cited by examiner

*Primary Examiner* — Daeho Song
(74) *Attorney, Agent, or Firm* — Shumaker & Sieffert, P.A.

(57) ABSTRACT

In one example, a method includes detecting, by a computing device, at least one user contact with a presence-sensitive screen of the computing device to input one or more characters of an input string. The method also includes detecting, by the computing device, a subsequent user contact with the presence-sensitive screen. The method also includes detecting, by the computing device, a gesture at a region of the presence-sensitive screen that is associated with a terminator symbol while the subsequent user contact is maintained with the presence-sensitive screen. The method also includes adding, by the computing device, the terminator symbol to the input string when the gesture comprises a virtual key press gesture. The method also includes replacing, by the computing device, the input string with a predicted completed string for the input string when the gesture comprises a prediction completion gesture.

19 Claims, 7 Drawing Sheets

PREDICTION COMPLETION GESTURE

BACKGROUND

A user may interact with applications executing on a mobile computing device (e.g., mobile phone, tablet computer, smart phone, or the like). For instance, a user may interact with the mobile computing device to install, view, or delete an application on the device.

In some instances, a user may interact with the computing device via a graphical user interface (GUI). For instance, a user may interact with a graphical user interface using a presence-sensitive screen (e.g., touchscreen) of the computing device. A user may interact with the graphical user interface of the computing device to enter text to communicate using text messages, emails, web sites, and social networking sites.

SUMMARY

In one example, a method comprises receiving, by a computing device, input indicating detection of at least one user contact with a presence-sensitive screen of the computing device to input one or more characters of an input string. The method also includes receiving, by the computing device, input indicating detection of a subsequent user contact with the presence-sensitive screen. The method further includes receiving, by the computing device, input indicating detection of a gesture at a region of the presence-sensitive screen that is associated with a terminator symbol while the subsequent user contact is maintained with the presence-sensitive screen. The method also includes determining, by the computing device, a gesture type of the gesture. The method further includes, when the gesture comprises a virtual key press gesture, adding the terminator symbol to the input string. The method also includes, when the gesture comprises a prediction completion gesture, replacing, with the computing device, the input string with a predicted completed string for the input string.

In one example, a computer-readable storage medium includes instructions that, when executed, perform operations including receiving, by a computing device, input indicating detection of at least one user contact with a presence-sensitive screen of the computing device to input one or more characters of an input string. The instructions, when executed, also perform operations including determining, by the computing device, one or more predicted completed strings for the input string and displaying the predicted completed strings to the presence-sensitive screen. The instructions, when executed, perform further operations including receiving, by the computing device, input indicating detection of a subsequent user contact with the presence-sensitive screen and receiving, by the computing device, input indicating detection of a gesture at a region of the presence-sensitive screen that is associated with a terminator symbol while the subsequent user contact is maintained with the presence-sensitive screen. The instructions, when executed, also perform operations including determining, by the computing device, a gesture type of the gesture. The instructions, when executed, perform further operations including, when the gesture includes virtual key press gesture, adding the terminator symbol to the input string with the computing device and, when the gesture includes a prediction completion gesture, replacing, with the computing device, the input string with one of the predicted completed strings.

In one example, a computing device includes one or more processors, a presence-sensitive screen, and an input module executed by the processors to receive input indicating detection of at least one user contact with a presence-sensitive screen of the computing device to input one or more characters of an input string, wherein the input module determines one or more predicted completed strings for the input string. The computing also includes a display module executed by the processors to display the predicted completed strings to the presence-sensitive screen, wherein the input module receives input indicating detection of a subsequent user contact with the presence-sensitive screen, and wherein the input module receives input indicating detection of a gesture at a region of the presence-sensitive screen that is associated with a terminator symbol while the subsequent user contact is maintained with the presence-sensitive screen. The computing device also includes means for determining a gesture type of the gesture, adding the terminator symbol to the input string when the gesture comprises a virtual key press gesture, and replacing the input string with one of the predicted completed strings when the gesture comprises a prediction completion gesture.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
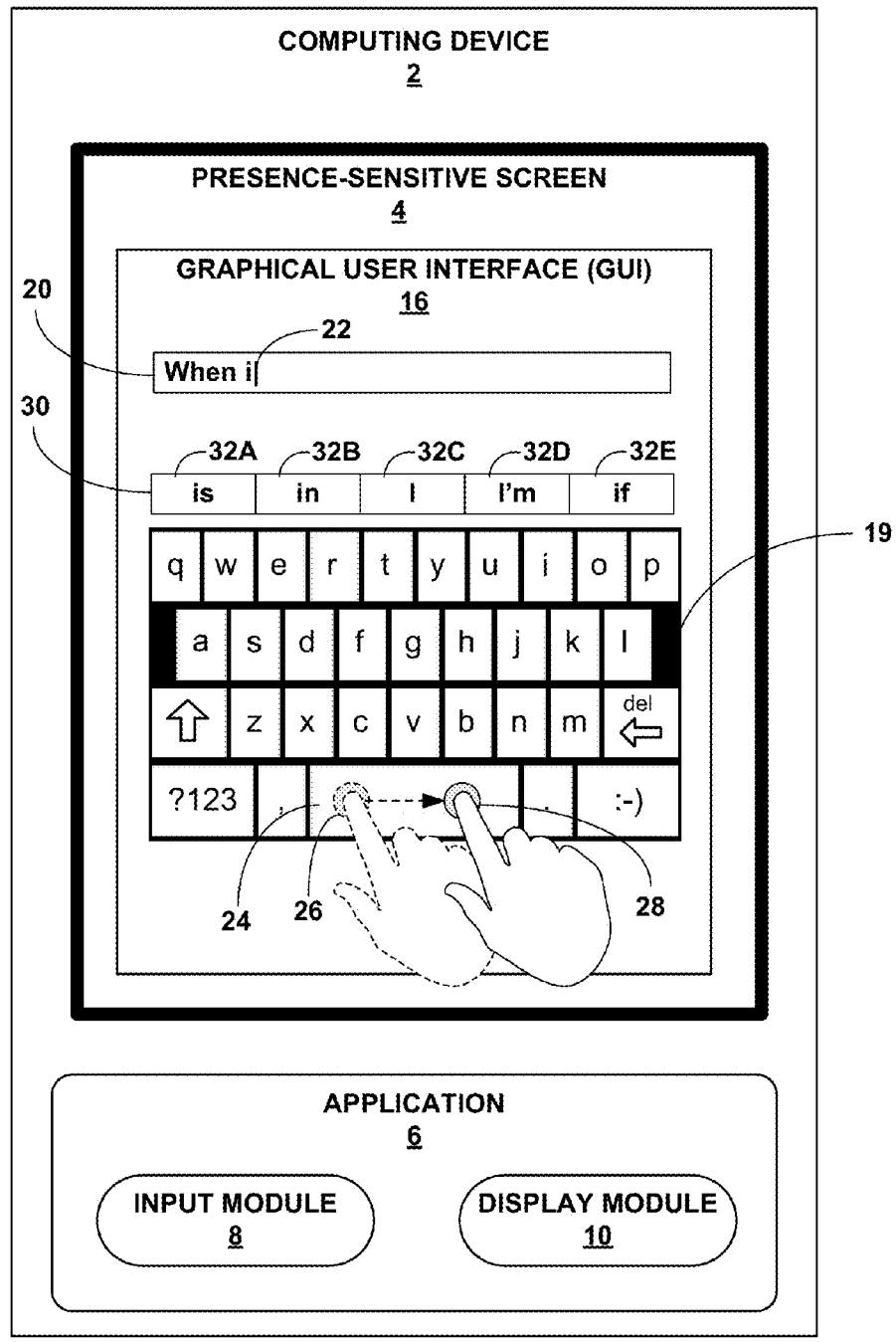
FIG. 1 is a block diagram illustrating an example of a computing device configured to execute one or more applications in accordance with one or more aspects of the present disclosure.

In general, aspects of this disclosure are directed to techniques for overloading a virtual keyboard provided by a presence-sensitive (e.g., touch-screen) device with multiple functions and disambiguating such functions using different gestures. Smart phones and tablet computers often receive user inputs as gestures performed at or near a presence-sensitive screen. Current text input methods typically use a spacebar press gesture as an indication that the user has finished inputting a word using a virtual keyboard application (or application module), whether by completing the string of characters that make up the word or by completing a substring of such characters that provide the virtual keyboard with a substring adequate to offer one or more predictions of the user's intended, complete word string that is longer than the entered string. Prediction in this manner is known as prediction completion, and some virtual keyboards offer a suggestion menu listing multiple prediction options for a text input from which the user may then select to complete the partially entered word with the selected prediction.

In one aspect of the disclosure, a presence-sensitive device is equipped with an input/output device, such as a presence-sensitive screen, to display a virtual keyboard and to receive user input in the form of gestures performed on the presence-sensitive screen. A user makes contact with (or is otherwise detected by the presence-sensitive screen at) regions of the presence-sensitive screen that correspond to different keys of the virtual keyboard displayed by the presence-sensitive screen. For example, the presence-sensitive screen displays a spacebar image in a spacebar region and alphabet keys in respective alphabet key regions. The user contacts alphabet key regions of the presence-sensitive screen to input character strings. When a user contacts the spacebar region with a virtual key press gesture, such as a "tap" gesture, the presence-sensitive device executes an action to add a space after and, in some aspects, correct a pending character string recently input by the user. This action is also known as a "space and correct" action. When a user contacts the spacebar region with a prediction completion gesture, such as a "tap and flick" gesture or a "swipe" gesture, the presence-sensitive device executes an action to prompt prediction completion for the pending character string. Associating, with the presence-sensitive device, different actions with different gestures input at the spacebar region of the presence-sensitive screen enables a user, in at least one example, to specify either the "space and correct" or "prediction completion" actions for text input. The techniques may also enable the presence-sensitive device to disambiguate among multiple gestures performed at the spacebar region and execute specified user actions corresponding to the gestures.

In some aspects of the disclosure, the presence-sensitive device responds to a prediction completion gesture input to the spacebar region by outputting a suggestion menu to a suggestion menu region of the presence-sensitive screen. The suggestion menu offers a list of one or more words predicted by the presence-sensitive device for the pending character string. The user may select one of the suggested words by inputting a prediction completion gesture to the spacebar region rather than migrating to input a selection gesture, for example, at the suggestion menu region. For example, responsive to the user inputting a prediction completion gesture in the spacebar region, the presence-sensitive device may graphically emphasize one of the words of the suggestion menu using a selection cursor. The selection cursor may include a pointer, word highlight, or word region background highlight, for example. The user inputs a prediction completion gesture in the spacebar region to move the selection cursor among the words of the suggestion menu. When the selection cursor is located at the desired word, the user completes the prediction completion gesture to select the desired word.

In some examples, the prediction completion gesture is a "swipe" gesture over the spacebar region of the presence-sensitive screen. The presence-sensitive device may associate different sub-regions of the spacebar region with respective words of the suggestion menu, and when the user contacts a particular sub-region, the presence-sensitive device moves the selection cursor to the word of the suggestion menu associated with that sub-region. The presence-sensitive device may alternatively associate different distance ranges computed from a start location of the swipe gesture on the spacebar region. As a user crosses a distance range boundary with the swipe gesture, the presence-sensitive device moves the selection cursor to the word of the suggestion menu associated with the newly entered distance range.

In some examples, the prediction completion gesture is a "hold" gesture that directs the presence-sensitive device to move the selection cursor from one word of the suggestion menu to the next, over timed intervals, so long as the user maintains contact with the spacebar region. In some examples where the selection gesture is a hold gesture, a pressure-sensitive device may moderate a rate at which the selection cursor moves from one word of the suggestion menu to the next according to a pressure applied by the user during the hold gesture. For instance, greater applied pressure may direct the pressure-sensitive device to move the selection cursor more quickly. In these examples, the user completes the selection gesture by lifting contact from the spacebar region.

FIG. 1 is a block diagram illustrating an example of a computing device configured to execute one or more applications in accordance with one or more aspects of the present disclosure. As shown in FIG. 1, computing device 2 includes a presence-sensitive screen 4 and an application 6.

Computing device 2, in some examples, includes or is a part of a portable computing device (e.g., a mobile phone, smart phone, netbook, laptop, or tablet) or a desktop computer. Computing device 2 may also connect to a wired or wireless network using a network interface. An example of computing device 2 is described in further detail with respect to FIG. 2.

Computing device 2 includes one or more input devices that receive user input specifying actions to be performed by computing device 2. In the illustrated example, presence-sensitive screen 4 is an input device that generates one or more signals corresponding to a location selected by a gesture performed on or near the presence-sensitive screen 4. In some examples, presence-sensitive screen 4 detects a presence of an input unit, e.g., a finger, pen or stylus that may be in close proximity to, but does not physically touch, presence-sensitive screen 4. As used herein, user "contact" may therefore refer to close proximity that is detected by presence-sensitive screen 4. In other examples, the gesture may include physical contact with presence-sensitive screen 4 to select the corresponding location, e.g., in the case of a touch-sensitive screen. Presence-sensitive screen 4, in some examples, generates a signal corresponding to the location of the input unit. Signals generated by the selection of the corresponding location(s) are then provided as data to applications, e.g., application 6, and other components of computing device 2.

In some examples, computing device 2 may include an input device such as a joystick, camera or other device capable of recognizing a gesture of user 18. In one example, a camera capable of transmitting user input information to computing device 2 may visually identify a gesture performed by user 18. Upon visually identifying the gesture of the user, a corresponding user input may be received by computing device 2 from the camera. The aforementioned examples of input devices are provided for illustration purposes. Other similar example techniques may also be suitable to detect a gesture and detected properties of a gesture.

Computing device 2 also includes one or more output devices that display content to user 18. In the illustrated example, presence-sensitive screen 4 of computing device 2 displays graphical content responsive to electronic signaling or other directives from computing device 2. Graphical content, generally, includes any visual depiction displayed by presence-sensitive screen 4. Examples of graphical content may include images, text, videos, visual objects and/or visual program components such as scroll bars, text boxes, buttons, etc. In the illustrated example, application 6 directs presence-sensitive screen 4 to display graphical user interface (GUI) 16.

Application 6 executing on computing device 2 includes program instructions and/or data that are executable by computing device 2. Examples of application 6 may include a web browser, email application, text messaging application or any other application that receives user input and/or displays graphical content.

Application 6 causes GUI 16 to be displayed by presence-sensitive screen 4. Graphical user interface 16 may include interactive and/or non-interactive graphical content that presents information of computing device 2 in human-readable form. GUI 16 enables user 18 to interact with application 6 through presence-sensitive screen 4. In this way, GUI 16 enables user 18 to create, modify, and/or delete data of computing device 2.

User 18 perform gestures on presence-sensitive screen 4, e.g., tapping virtual keys displayed at regions of graphical virtual keyboard 19 that provides input to input field 20 of GUI 16. Input field 20 displays text recently processed by application 6 responsive to gestures performed by user 18 on graphical virtual keyboard 19. In the illustrated example, user 18 performs gestures at regions associated with different virtual keys displayed by virtual keyboard 19. Input module 8 of application 6 processes the gestures to direct display module 10 to display input text in input field 20. Input field also displays a cursor 22 that indicates where, with respect to other text displayed in input field 20, application 6 will place a next character input by user 18.

Virtual keyboard 19 displays a plurality of alphabet characters that, in this example, represent the lower-case English alphabet, as well as a plurality of terminator symbols (alternatively, "terminators") that, in accordance with the particular language displayed by virtual keyboard 19, indicate that a word of the language is complete, or "terminated." Terminators displayed by virtual keyboard 19 include a period, comma, and space. Other terminators include, for example, colons, semi-colons, parentheses, and quotation marks. By performing a gesture in a region of presence-sensitive screen 4 associated with a terminator, user 18 may input the terminator to application 6 for display in input field 20. For illustrative purposes, the techniques of this disclosure are described herein with respect to a space. However, the techniques may apply to any terminator. A space is associated with spacebar region 24 of virtual keyboard 19 and may be used by user 18 to terminate words input to virtual keyboard 19. Virtual keyboard 19 may, in other example, display keys for characters, words, and/or terminators of any language.

Input module 8 of application 6 receives gesture data from presence-sensitive screen 4 describing gestures performed by user 18. Gesture data may include, for example, one or more gesture locations on presence-sensitive screen 4, gesture timing associated with one or more gesture locations, and/or hold length of a gesture. For example, presence-sensitive screen 4 may initially generate a signal that represents a selected location of the screen. Presence-sensitive screen 4 may subsequently generate gesture data representing the signal, which may be sent to input module 8. In some examples, gesture data may include a set of coordinates corresponding to a coordinate system used by presence-sensitive screen 4 to identify a location selected on the screen. In some examples, presence-sensitive screen 4 includes a pressure-sensitive screen that detects an amount of pressure applied in the course of a gesture. In such examples, gesture data includes pressure data describing the amount of pressure applied. Input module 8 processes gesture data to identify gestures performed and to associate performed gestures with respective actions specified for the gestures. In some aspects, input module 8 is a virtual keyboard library or module linked to or otherwise executed by application 6.

Input module 8 executes the actions, which in some instances may cause display module 10 to update GUI 16. For example, upon input module 8 identifying a "tap" (or "virtual key press") gesture input by user 18 at a region associated with an alphabet key of virtual keyboard 19, input module 8 may execute an action directing display module 18 to add the alphabet character for the alphabet key to input field 20 at the location identified by cursor 22.

As user 18 inputs text to input field 20, input module 8 analyzes the input text to predict intended words. Input module 8 identifies, for recently input text, one or more predicted words that meet a threshold probability of being a word intended by user 18. Display 10 then updates GUI 16 to present suggestion menu 30 that lists predictions 32A-32E ("predictions 32") identified by input module 8 for the recently input text. In some examples, display 10 may present only a most probable one of predictions 32 in suggestion menu 30 or otherwise present more/fewer predictions. Display 10 may order predictions 32 of suggestion menu 30 according to respective probabilities or another priority arrangement, where predictions 32 may be ordered from highest priority to lowest. In some examples, user 18 may perform a tap or other gesture in a region of presence-sensitive screen 4 that is associated with suggestion menu 30 to select one of predictions 32.

When user 18 performs a gesture in a region of presence-sensitive screen 4 that is associated with a terminator, e.g., spacebar region 24, input module 8 receives gesture data and determining whether the gesture is a prediction completion gesture or a virtual key press gesture. On determining the gesture is a virtual key press gesture, input module 8 terminates the word by adding the terminator associated with the pressed virtual key to the end of the recently input text. For example, input module 8 may add a space to input field 20 upon determining that user 18 has performed a virtual key press gesture in spacebar region 24. In some examples, input module 8 may perform a "space and correct" action whereby input module 8, in addition to adding a space to input field 20, corrects the newly-terminated word.

As illustrated, user 18 performs a first motion gesture that originates from a first location 26 in spacebar region 24 of presence-sensitive screen 4. The first motion gesture is a horizontal swipe gesture such that user 18 moves his/her finger from first location 26 to second location 28 in spacebar region 24 of presence-sensitive screen 4. Input module 8 receives gesture data generated by presence-sensitive screen 4 that indicates the first motion gesture. Input module 8 associates the horizontal swipe gesture with a prediction completion action. The horizontal swipe gesture is therefore a prediction completion gesture in this example. In some examples, prediction completion gestures may include a double-tap gesture indicated by user 18 tapping twice successively at first location 26 in spacebar region 24, a "tap and flick" gesture indicated by user 18 pausing briefly at first location 26 before moving his/her finger from first location 26 to second location 28, or other gestures distinguishable from a virtual key press gesture.

As noted above, input module 8 receives gesture data indicating the first motion gesture. Input module 8 determines that the first motion gesture is a prediction completion gesture by mapping the gesture data to a prediction completion action. In some examples, the first motion gesture is only a prediction completion gesture when either first location 26 or second location 28 is located within a region associated with a terminator, such as spacebar region 24. Upon determining the first motion gesture is a prediction completion gesture, input module 8 automatically completes a recently input string of characters with a word predicted by input module 8. Display module 10 then replaces, in input field 20, the input string with the predicted word. Application module 6 may replace the input string with the predicted word in internal memory of computing device 2 that stores text inputs.

The predicted word may in some cases be longer than the input string. The predicted word used by input module 8 to replace the input string may be one of predictions 32. For example, prediction 32A may be the most probable one of predictions 32, and a prediction completion gesture performed by user 18 may indicate the user's intent to select the most probable prediction. In some examples, prediction 32A is the only prediction displayed by display module 10 to GUI 16. In some examples, display module 10 does not display a predicted word to GUI 16.

In some examples, input module 8 additionally identifies a terminator for the prediction completion gesture by determining the first motion gesture begins or, in some examples, ends at a location in a region of presence-sensitive screen 4 that is associated with the terminator. In such examples, input module 8 adds the identified terminator to input field 20 to indicate termination of the predicted word that replaces the input string.

In some examples, display module 10 may display a predicted word to GUI 16 in a portion of spacebar region 24. For example, display module 10 may split the virtual spacebar key to display a space (or nothing) on a first portion of the virtual spacebar key and a predicted word on a second portion of the virtual spacebar key. Display module 10 may delineate the first and second portions. In these examples, input module 8 may associate gestures performed with respect to the first portion with a virtual key press action and associate gestures performed with respect to the second portion with a prediction completion action. Alternatively, input module 8 may use the displayed predicted word to complete an input string when a prediction completion is performed at any region associated with a terminator.

Various aspects of the disclosure may improve a user experience of computing device 2 by permitting text input with less finger movement. Associating, with computing device 2, different actions with different gestures input at spacebar region 24 of presence-sensitive screen 4 enables a user to specify either a virtual key press action, such as a "space and correct" action, or a "prediction completion" action for text input. The techniques may also enable computing device 2 to disambiguate among multiple gestures performed at spacebar region 24 and execute respective specified user actions corresponding to the gestures. In this way, user 18 may avoid moving his/her finger to suggestion menu 30 to specify prediction completion while still permitting the user to input a space at spacebar region 24.

Figure 2:
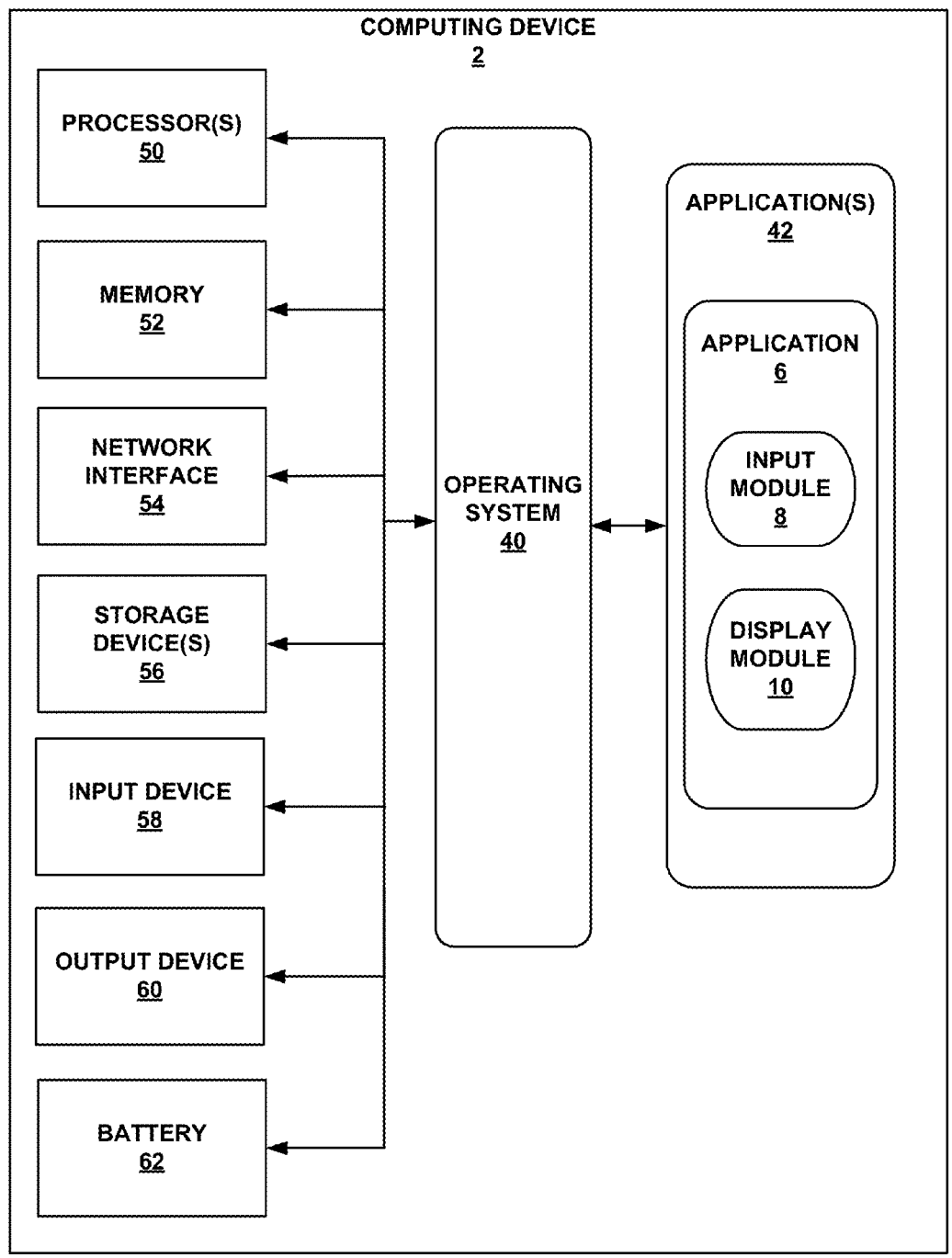
FIG. 2 is a block diagram illustrating further details of one example of the computing device shown in FIG. 1, in accordance with one or more aspects of the present disclosure.

FIG. 2 is a block diagram illustrating further details of one example of computing device 2 shown in FIG. 1, in accordance with one or more aspects of the present disclosure. FIG. 2 illustrates only one particular example of computing device 2. Many other example embodiments of computing device 2 may be used in other instances.

As shown in the specific example of FIG. 2, computing device 2 includes one or more processors 50, memory 52, a network interface 54, one or more storage devices 56, input device 58, output device 60, and battery 62. Computing device 2 also includes an operating system 40. Computing device 2, in one example, further includes application 6 and one or more other applications 42. Application 6 and one or more other applications 42 are also executable by computing device 2. Components of computing device 2 may be interconnected (physically, communicatively, and/or operatively) for inter-component communications.

Processors 50, in one example, implement functionality and/or process instructions for execution within computing device 2. For example, processors 50 may be capable of processing instructions stored in memory 52 and/or instructions stored on storage devices 56.

Memory 52, in one example, store information within computing device 2 during operation. Memory 52, in some examples, represents a computer-readable storage medium. In some examples, memory 52 is a temporary memory, meaning that a primary purpose of memory 52 is not long-term storage. Memory 52, in some examples, is described as a volatile memory, meaning that memory 52 does not maintain stored contents when the computer is turned off. Examples of volatile memories include random access memories (RAM), dynamic random access memories (DRAM), static random access memories (SRAM), and other forms of volatile memories known in the art. In some examples, memory 52 is used to store program instructions for execution by processors 50. Memory 52, in one example, is used by software or applications running on computing device 2 (e.g., application 6 and/or one or more other applications 42) to temporarily store data and/or instructions during program execution.

Storage devices 56, in some examples, also include one or more computer-readable storage media. Storage devices 56 may be configured to store larger amounts of information than memory 52. Storage devices 56 may further be configured for long-term storage of information. In some examples, storage devices 56 include non-volatile storage elements. Examples of such non-volatile storage elements include magnetic hard disks, optical discs, floppy disks, Flash memories, or forms of electrically programmable memories (EPROM) or electrically erasable and programmable (EEPROM) memories.

Computing device 2, in some examples, also includes a network interface 54. Computing device 2, in such examples, uses network interface 54 to communicate with external devices via one or more networks, such as one or more wired or wireless networks. Network interface 54 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, computing device 2 uses network interface 54 to wirelessly communicate with an external device (not shown) such as a server, mobile phone, or other networked computing device.

Computing device 2 also includes one or more input devices 58. Input device 58, in some examples, is configured to receive input from a user through tactile, electromagnetic, audio, and/or video feedback. Examples of input device 58 include a presence-sensitive screen (e.g., presence-sensitive screen 4 shown in FIG. 1), mouse, keyboard, voice responsive system, video camera, microphone or any other type of device for detecting gestures by a user. In some examples, a presence-sensitive screen includes a touch-sensitive screen.

One or more output devices 60 may also be included in computing device 2. Output device 60, in some examples, is configured to provide output to a user using tactile, audio, or video stimuli. Output device 60, in one example, includes a display (e.g., presence-sensitive screen 4 shown in FIG. 1), sound card, a video graphics adapter card, or any other type of device for converting a signal into an appropriate form understandable to humans or machines. Additional examples of output device 60 include a speaker, a cathode ray tube (CRT) monitor, a liquid crystal display (LCD), or any other type of device that can generate intelligible output to a user.

Computing device 2, in some examples, may include one or more batteries 62, which may be rechargeable and provide power to computing device 2. Battery 62, in some examples, is made from nickel-cadmium, lithium-ion, or other suitable material.

Examples of computing device 2 may include operating system 40. Operating system 40 controls the operation of components of computing device 2. For example, operating system 40 facilitates the interaction of application 6 with hardware components of computing device 2. As shown in FIG. 2, application 6 includes input module 8 and display module 10 as described in FIG. 1. Input module 8 and display module 10 may each include program instructions and/or data that are executable by computing device 2. For example, input module 8 may includes instructions that cause application 6 executing on computing device 2 to perform one or more of the operations and actions described in FIGS. 1 and 3-7. Similarly, display module 10 may include instructions that cause application 6 executing on computing device 2 to perform one or more of the operations and actions described in FIGS. 1 and 3-7.

In some examples, input module 8 and/or display module 10 may be a part of operating system 40 executing on computing device 2. In some examples, input module 8 may receive input from one or more input devices 58 of computing device 2. Input module 8 may for example recognize gesture input and provide gesture information to, e.g., application 6.

Any applications, e.g., application 6 or other applications 42, implemented within or executed by computing device 2 may be implemented or contained within, operable by, executed by, and/or be operatively/communicatively coupled to components of computing device 2, e.g., processors 50, memory 52, network interface 54, storage devices 56, input device 58, and/or output device 60.

Figure 3:
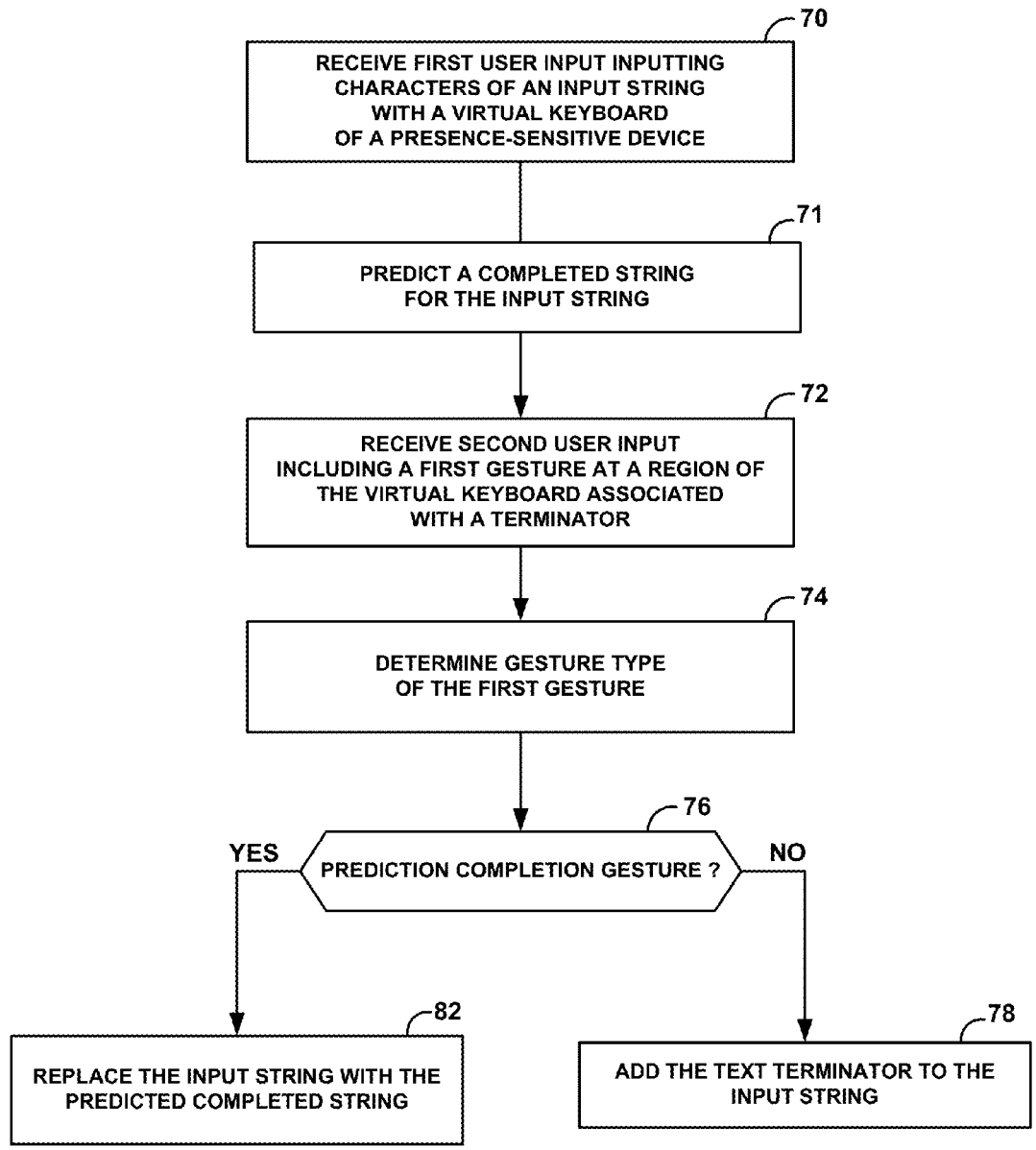
FIG. 3 is a flow diagram illustrating an example method that may be performed by a computing device to identify a prediction completion performed on a presence-sensitive screen, in accordance with one or more aspects of the present disclosure.

FIG. 3 is a flow diagram illustrating an example method that may be performed by a computing device to identify a prediction completion performed on a presence-sensitive display, in accordance with one or more aspects of the present disclosure. The method is described for illustrative purposes with respect to computing device 2 of FIG. 1.

Input module 8 of application 6 receives gesture data from presence-sensitive screen 4 indicating receipt of first user input from user 18 inputting characters of an input string with virtual keyboard 19 (70). Input module 8 uses the input string to predict a completed string for the input string (71). In some instances, display module 10 displays the predicted completed string for the input string to GUI 16.

Input module 8 subsequently receives gesture data from presence-sensitive screen 4 for a second user input, including a first gesture, at a region of virtual keyboard 19 that is associated with a terminator (72). The terminator may be a space character that is associated with spacebar region 24 of presence-sensitive screen 4, for instance. Input module 8 determines, from the gesture data for the first gesture of the second user input, a gesture type of the second user input (74). If the first gesture includes a prediction completion gesture (YES branch of 76), such as a "tap and flick" gesture, input module 8 performs a prediction completion action by replacing the input string with the predicted completed string (82). Display module 10 may indicate this replacement by replacing a depiction of the input string with the predicted completed string in input field 20 or other elements of GUI 16.

If, however, the first gesture does not include a prediction completion gesture (NO branch of 76), input module 8 performs a virtual key press action to add the terminator to the input string to complete the word represented by the input string (78). In some instances, input module 8 corrects the word to perform a "terminate and correct" action. Display module 10 may indicate this terminator addition by adding a depiction of the terminator to input field 20 or other elements of GUI 16.

Figure 4:
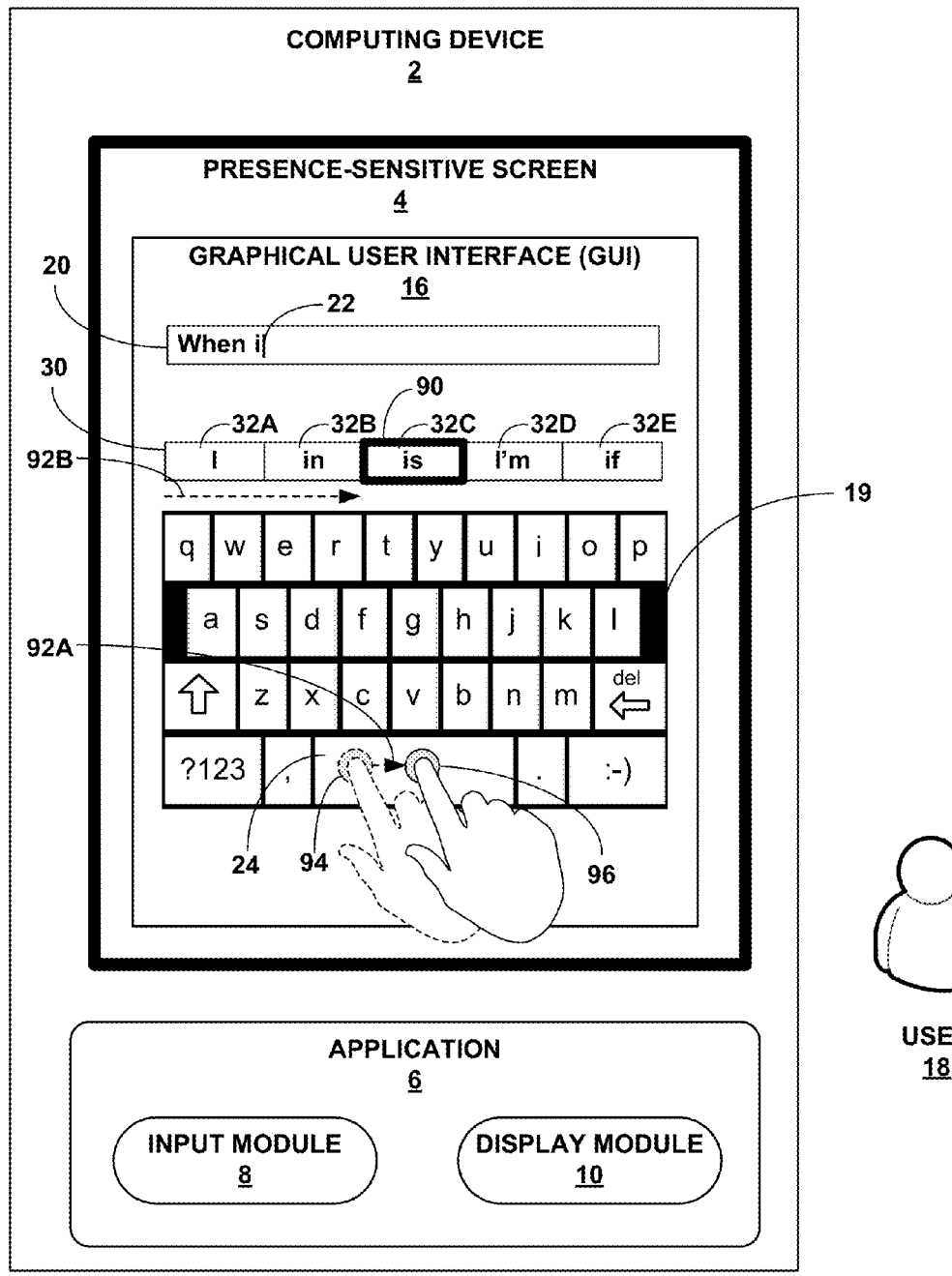
FIG. 4 is a block diagram illustrating an example of a computing device that, in accordance with one or more aspects of this disclosure, graphically emphasizes predicted words for selection according to a prediction completion gesture.

FIG. 4 is a block diagram illustrating an example of a computing device that, in accordance with one or more aspects of this disclosure, graphically emphasizes predicted words for selection according to a prediction completion gesture. As in the example of FIG. 1, as user 18 inputs text to input field 20, input module 8 analyzes the input text to predict intended words. Input module 8 identifies, for recently input text, one or more predicted words that meet a threshold probability of being a word intended by user 18. Display 10 then updates GUI 16 to present suggestion menu 30 that lists predictions 32 identified by input module 8 for the recently input text.

Display 10 additionally displays cursor 90 in GUI 16 to graphically emphasize the one of predictions 32 for selection. In this example, cursor 90 is a large-bordered box that surrounds any of predictions 32. Cursor 90 may in other examples be an arrow or other cursor, a background color that distinguishes the prediction for selection from other predictions 32, a text color that distinguishes text of the prediction for selection from other predictions 32, or any other visual representation that emphasizes one of predictions 32 from other predictions 32.

A prediction completion gesture performed by user 18 in a region of presence-sensitive screen 4 that is associated with a terminator, e.g., spacebar region 24, causes input module 8 to direct display module 10 to move cursor 90 along suggestion menu 30 according to properties of the prediction completion gesture. In the illustrated example, user 18 performs motion gesture 92A that originates from a first location 94 in spacebar region 24 of presence-sensitive screen 4. Motion gesture 92A is a horizontal swipe gesture such that user 18 moves his/her finger from first location 94 to second location 96 in spacebar region 24 of presence-sensitive screen 4. As the user 18 moves his/her finger along the vector illustrated by motion gesture 92A, input module 8 receives gesture data generated by presence-sensitive screen 4 that indicates motion gesture 92A. Input module 8 associates the horizontal swipe gesture with a prediction completion action.

As user 18 moves his/her finger from first location 94 to second location 96, input module 8 directs display module 10 to move cursor 90 according to cursor movement 92B. Cursor 90 begins motion gesture 92A by emphasizing prediction 32A but ends motion gesture 92A by emphasizing prediction 32C. At an intermediate point between first location 94 and second location 96, cursor 90 emphasizes prediction 32B.

A magnitude of a vector defined by motion gesture 92A may determine a magnitude of cursor movement 92B. For example, the larger the magnitude of motion gesture 92A (e.g., the further the distance from first location 94 to second location 96), the further display 10 moves cursor 90 along suggestion menu 30. In the illustrated example, cursor movement 92B is substantially parallel to a direction of motion gesture 92A. This is not, however, a requirement, for suggestion menu 30 may be arrayed in any direction. In addition, in some examples, motion gesture 92B may occur in any direction along presence-sensitive screen 4. In some instances, first location 94 may be located outside of spacebar region 24 while second location 96 is located within spacebar region 24. In some instances, first location 94 may be located within spacebar region 24 while second location 96 is location outside of spacebar region 24.

When user 18 lifts his/her finger from presence-sensitive screen 4 at second location 96, input module 8 processes the gesture data to select the currently-emphasized one of predictions 32, as indicated by a location of cursor 90. Input module 8 automatically completes a recently input string of characters with the selected one of predictions 32. Display module 10 then replaces, in input field 20, the input string with the predicted word. Application module 6 may replace the input string with the predicted word in internal memory of computing device 2 that stores text inputs.

In some examples, user 18 may use different gesture types to select different predictions 32. For example, user 18 may perform a "tap and flick" gesture to select first prediction 32A but perform motion gesture 92A to select any of the other predictions 32B-32E. As in the example of FIG. 1, user 18 may in any of the examples described with respect to FIG. 4 perform a virtual key press to direct input module 8 to terminate the word using the terminator associated with the pressed virtual key. In other words, input module 8 disambiguates between prediction completion gestures and virtual key press gestures in the examples of FIG. 4.

In some examples, display module 10 delineates different sub-regions of spacebar region 24 that input module 8 associates with respective predictions 32. As motion gesture 92A enters and exits different sub-regions, input module 8 receives and processes gesture data for motion gesture 92A and directs display module 10 to move cursor 90 to emphasize predictions 32 associated with the different sub-regions of spacebar region 24. When user 18 lifts his/her finger from presence-sensitive screen 4 at second location 96, input module 8 receives and processes gesture data to determine the sub-region of spacebar region 24 in which second location 96 is located. Input module 8 selects, as the predicted word for recently input text, the one or predictions 32 associated with the sub-region of spacebar region 24 in which second location 96 is located.

Figure 5:
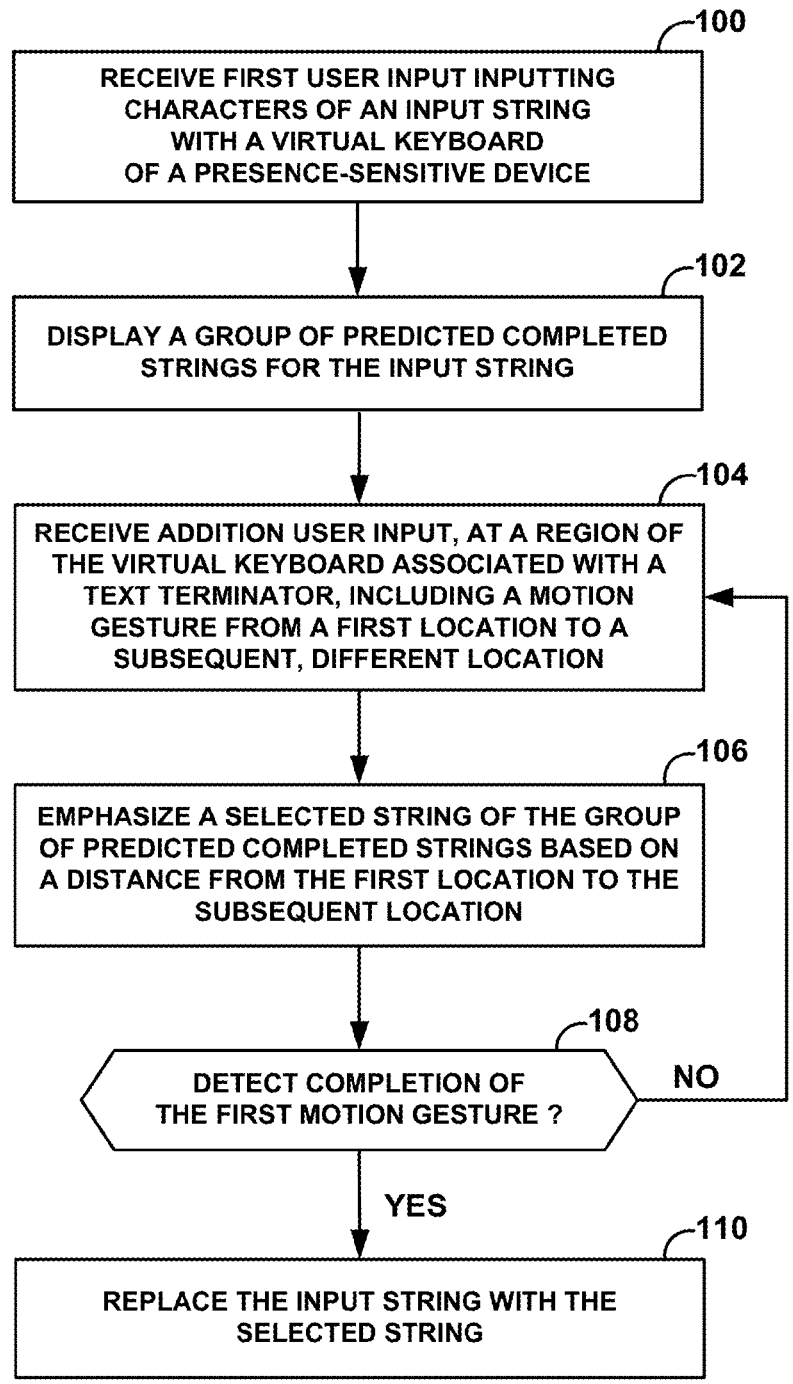
FIG. 5 is a flow diagram illustrating an example method that may be performed by a computing device to provide visual feedback during a prediction completion gesture performed on a presence-sensitive screen, in accordance with one or more aspects of the present disclosure.

FIG. 5 is a flow diagram illustrating an example method that may be performed by a computing device to provide visual feedback during a prediction completion gesture performed on a presence-sensitive display, in accordance with one or more aspects of the present disclosure. The method is described for illustrative purposes with respect to computing device 2 of FIG. 4.

Input module 8 of application 6 receives gesture data from presence-sensitive screen 4 indicating receipt of first user input from user 18 inputting characters of an input string with virtual keyboard 19 (100). Input module 8 uses the input string to predict a group of completed string for the input string and directs display module 10 to display the group arrayed as suggestion menu 30 of GUI 16 (102).

After receiving the first user input, input module 8 receives gesture data from presence-sensitive screen 4 for additional user input, including subsequent user contact in the form of a motion gesture from a first location to a subsequent, different location, at a region of virtual keyboard 19 that is associated with a terminator (104). Here, "subsequent" characterizes the subsequent location as being contacted by user 18, during the motion gesture, later in time than the first location. The terminator may be a space character that is associated with spacebar region 24 of presence-sensitive screen 4, for instance. Input module 8 processes the gesture data to select, based on a distance from the first location to the subsequent location, one of predictions 32 to emphasize, and input module 8 directs display module 10 to emphasize the selected prediction by moving cursor 90 to the selected prediction (106).

Input module 8 then processes the gesture data to determine whether user 18 has lifted his/her finger from presence-sensitive screen 4 (108). If user 18 has lifted his/her finger (YES branch of 108), input module 8 performs a prediction completion action by replacing the input string with the currently emphasized, selected prediction 32 as indicated by cursor 90 (110). Otherwise (NO branch of 108), input module 8 may receive additional gesture data from presence-sensitive screen 4 indicating receipt of user input at a still further, subsequent location as part of the motion gesture (104). Input module 8 processes the gesture data to emphasize another one of predictions 32 based on the distance from the first location to this further, subsequent location (106).

Figure 6:
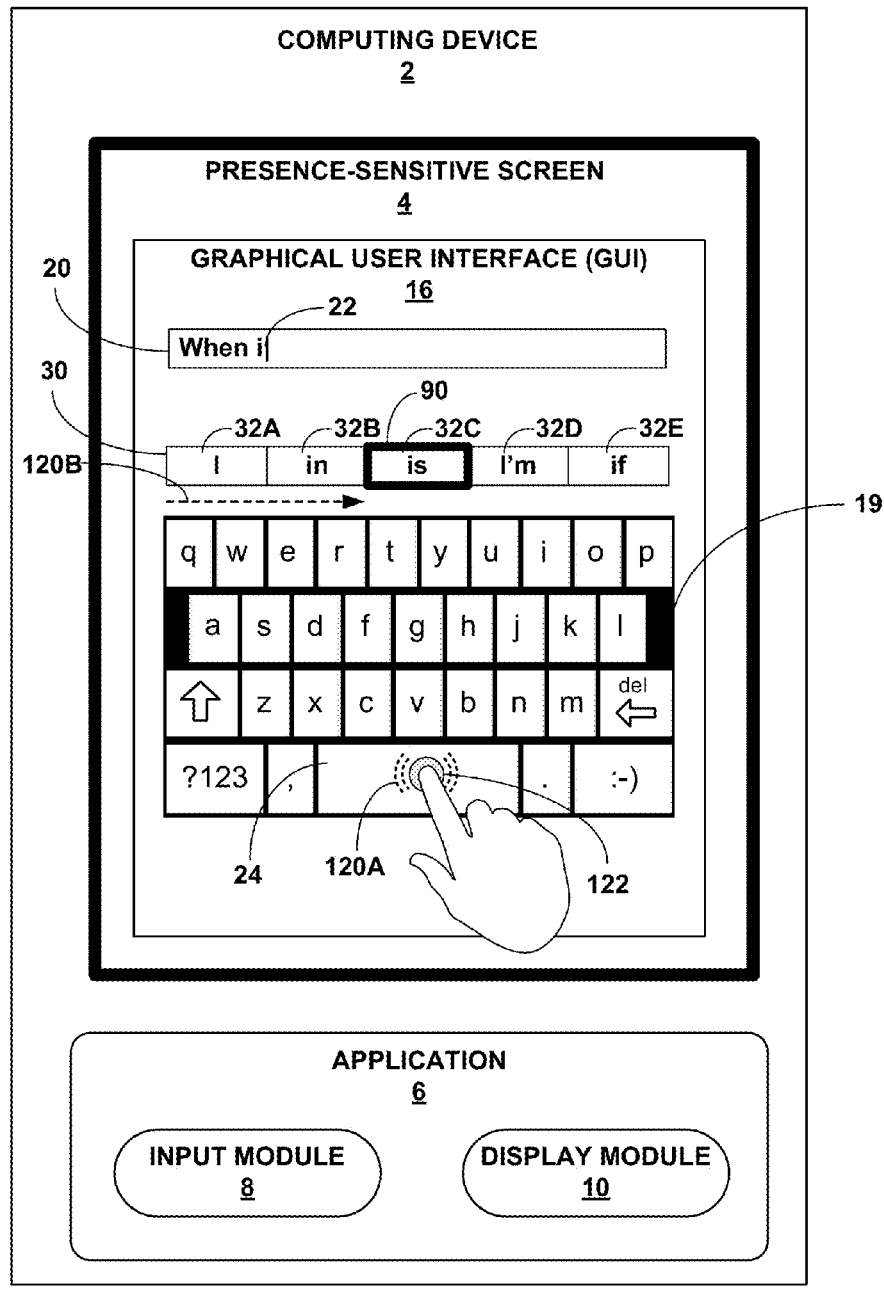
FIG. 6 is a block diagram illustrating an example of a computing device that, in accordance with one or more aspects of this disclosure, graphically emphasizes predicted words for selection according to a prediction completion gesture.

FIG. 6 is a block diagram illustrating an example of a computing device that, in accordance with one or more aspects of this disclosure, graphically emphasizes predicted words for selection according to a prediction completion gesture. As in the example of FIG. 1, as user 18 inputs text to input field 20, input module 8 analyzes the input text to predict intended words. Input module 8 identifies, for recently input text, one or more predicted words that meet a threshold probability of being a word intended by user 18. Display 10 then updates GUI 16 to present suggestion menu 30 that lists predictions 32 identified by input module 8 for the recently input text. As described with respect to FIG. 4, display 10 additionally displays cursor 90 in GUI 16 to emphasize one of predictions 32 for selection.

In this example, input module 8 associates a hold gesture 122A with a prediction completion action. User 18 holds his/her finger present at a region of presence-sensitive screen 4 associated with a terminator for a threshold amount of time to perform a prediction completion gesture that is a hold gesture. In the example of FIG. 6, user 18 holds his/her finger at location 122 of spacebar region 24 of virtual keyboard 19 for at least the threshold amount of time to perform prediction completion gesture 120A. In some examples, the threshold amount of time is 0.5 seconds.

The threshold amount of time may be associated with a first one of predictions 32, i.e., prediction 32A, of suggestion menu 30. As user 18 continues to maintain his/her finger presence at location 122, input module 8 receives and processes gesture data from presence-sensitive screen 4 indicating the passage of additional hold time. Input module 8 may periodically direct display 10 to move cursor 90 while user 18 maintains hold gesture 120A. In some examples, the period of cursor 90 movement is 0.5 seconds. The period of cursor 90 movement may be variable.

For example, after user 18 initiates presence at location 122 of spacebar region 24, input module 8 receives gesture data indicates this presence and may initiate a timer or counter. After user 18 maintains presence substantially at location 122 for the threshold amount of time, input module 8 directs display module 10 to emphasize prediction 32A (the first item of suggestion menu 30). If user 18 continues to maintain this presence substantially at location 122 for a period of cursor 90 movement, then input module 8 directs display module to emphasize prediction 32B (the second item of suggestion menu 30), and so on.

Cursor 90 may in such examples include a continuous movement of cursor 90 that indicates to user 18 when the cursor 90 will move to the next one of predictions 32. For example, as user 18 continues to maintain a presence substantially at location 122, input module 8 may direct display module 10 to continuously move a vertical line or an arrow representing cursor 90 from left to right along suggestion menu 30. When cursor 90 is located within one of predictions 32, that prediction is emphasized for selection. As another example, as user 18 continues to maintain a presence substantially at location 122, input module 8 may direct display module 10 to continuously "fill," with an emphasis fill color, a box surrounding an emphasized one of predictions 32 for selection. When the box is "filled" with the fill color, input module 8 directs display module 10 to begin filling the next one of predictions 32 in suggestion menu 30 for selection. In this way, cursor 90 is located at the one of predictions 32 being filled.

In some examples, presence-sensitive screen 4 is a pressure-sensitive screen that detects an amount of pressure applied by user 18. Presence-sensitive screen 4 in such examples provides pressure data to input module 8, which input module 8 uses to moderate the rate of movement of cursor 90. For example, input module 8 may correlate the rate of movement of cursor 90 to an amount of pressure applied by user 18 at location 122.

When user 18 lifts his/her finger from presence-sensitive screen 4 substantially at location 122, input module 8 processes the gesture data to select the currently-emphasized one of predictions 32, as indicated by a location of cursor 90. Input module 8 automatically completes a recently input string of characters with the selected one of predictions 32. Display module 10 then replaces, in input field 20, the input string with the predicted word. Application module 6 may replace the input string with the predicted word in internal memory of computing device 2 that stores text inputs.

In some examples, user 18 may use different gesture types to select different predictions 32. For example, user 18 may perform a "tap and flick" gesture to select first prediction 32A but perform hold gesture 120A to select any of the other predictions 32B-32E. As in the example of FIG. 1, user 18 may in any of the examples described with respect to FIG. 6 perform a virtual key press to direct input module 8 to terminate the word using the terminator associated with the pressed virtual key. In other words, input module 8 disambiguates between prediction completion gestures and virtual key press gestures in the examples of FIG. 6.

Figure 7:
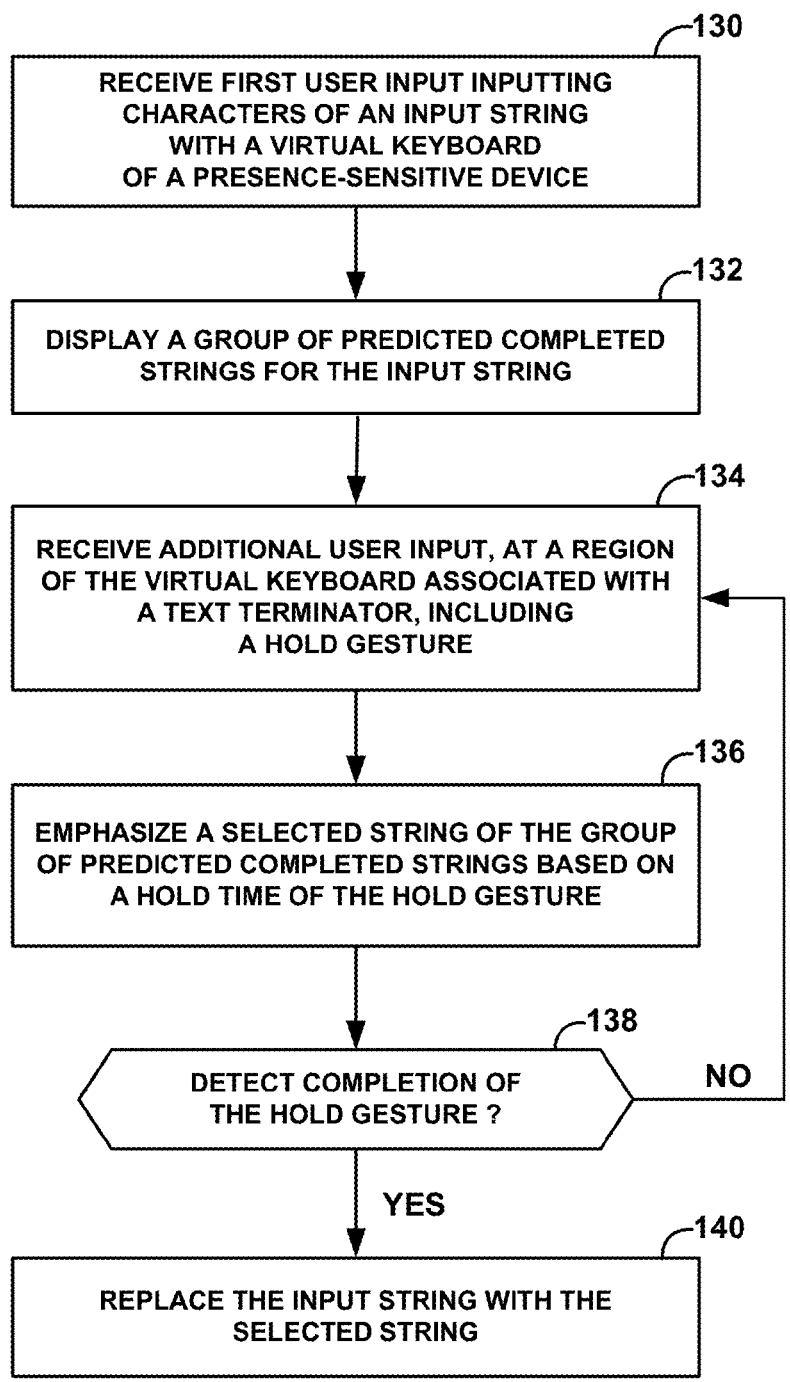
FIG. 7 is a flow diagram illustrating an example method that may be performed by a computing device to provide visual feedback during a prediction completion gesture performed on a presence-sensitive screen, in accordance with one or more aspects of the present disclosure.

FIG. 7 is a flow diagram illustrating an example method that may be performed by a computing device to provide visual feedback during a prediction completion gesture performed on a presence-sensitive display, in accordance with one or more aspects of the present disclosure. The method is described for illustrative purposes with respect to computing device 2 of FIG. 6.

Input module 8 of application 6 receives gesture data from presence-sensitive screen 4 indicating receipt of first user input from user 18 inputting characters of an input string with virtual keyboard 19 (130). Input module 8 uses the input string to predict a group of completed string for the input string and directs display module 10 to display the group arrayed as suggestion menu 30 of GUI 16 (132).

After receiving the first user input, input module 8 receives gesture data from presence-sensitive screen 4 for additional user input, including subsequent user contact in the form of a hold gesture, at a region of virtual keyboard 19 that is associated with a terminator (134). The terminator may be a space character that is associated with spacebar region 24 of presence-sensitive screen 4, for instance. Input module 8 processes the gesture data to select, based on a hold time of the hold gesture, one of predictions 32 to emphasize, and input module 8 directs display module 10 to emphasize the selected prediction by moving cursor 90 to the selected prediction (136). In this example, the longer the hold gesture is maintained, the further input module 8 directs display module 10 to move cursor 90 along suggestion menu 30.

Input module 8 processes the gesture data to determine whether user 18 has lifted his/her finger from presence-sensitive screen 4 (138). If user 18 has lifted his/her finger (YES branch of 138), input module 8 performs a prediction completion action by replacing the input string with the currently emphasized, selected prediction 32 as indicated by cursor 90 (140). Otherwise (NO branch of 138), input module 8 may receive additional gesture data from presence-sensitive screen 4 indicating receipt of user input for the hold gesture (134). Input module 8 processes the gesture data to emphasize another one of predictions 32 based on a hold time of the hold gesture (106).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
    detecting, by a computing device, at a presence-sensitive screen of the computing device, a first gesture;
    determining, by the computing device and based on the first gesture, one or more characters of an input string;
    detecting, by the computing device, at a region of the presence-sensitive screen that is associated with a terminator symbol, a second gesture, the second gesture detected after the first gesture;
    determining, by the computing device, a type of the second gesture;
    responsive to determining that the type of the second gesture is a virtual key press gesture type, adding, by the computing device, the terminator symbol to the input string and outputting, by the computing device and for display at the presence-sensitive screen, the terminator symbol;
    responsive to determining that the type of the second gesture is a prediction completion gesture type that is different than the virtual key press gesture type, outputting, by the computing device and for display at the presence-sensitive screen, a combination of a predicted completed string for the input string and the terminator symbol.

2. The method of claim 1, further comprising:
    determining, by the computing device, one or more predicted completed strings for the input string; and
    outputting, by the computing device and for display at the presence-sensitive screen, the one or more predicted completed strings.

3. The method of claim 2, further comprising:
    outputting, by the computing device and for display at the presence-sensitive screen, the one or more predicted completed strings in a prioritized arrangement, wherein the predicted completed string comprises a highest priority predicted completed string of the prioritized arrangement.

4. The method of claim 3, further comprising:
    outputting, by the computing device and for display at the presence-sensitive screen, the one or more predicted completed strings in the prioritized arrangement according to respective computed probabilities for the one or more predicted completed strings.

5. The method of claim 2, further comprising:
    selecting, by the computing device and based at least in part on one or more properties of the second gesture, the predicted completed string from the one or more predicted completed strings to output the combination of the predicted completed string for the input string and the terminator symbol.

6. The method of claim 2, wherein the second gesture comprises a first motion gesture from a first location of the presence-sensitive screen to a second location of the presence-sensitive screen, the first motion gesture being a prediction completion gesture type, and the method further comprising:
    outputting, by the computing device and for display at the presence-sensitive screen, a graphical emphasis for the predicted completed string based at least in part on a distance from the first location to the second location.

7. The method of claim 6, further comprising:
    detecting, by the computing device, a completion of the second gesture; and
    responsive to detecting the completion of the second gesture, by the computing device, selecting the predicted completed string from the one or more predicted completed strings to output the combination of the predicted completed string for the input string and the terminator symbol.

8. The method of claim 6, wherein the region of the presence-sensitive screen that is associated with the terminator symbol includes one of the first location or the second location.

9. The method of claim 6,
    wherein outputting the graphical emphasis for the predicted completed string comprises outputting, by the computing device and for display at the presence-sensitive screen, a cursor movement to the predicted completed string,
    wherein the first motion gesture is substantially parallel to a direction of the cursor movement.

10. The method of claim 2, wherein the second gesture comprises a hold gesture that is a prediction completion gesture type, the method further comprising:
    outputting, by the computing device and for display at the presence-sensitive screen, a graphical emphasis for the predicted completed string based at least on a hold time of the hold.

11. The method of claim 10, further comprising:
    detecting, by the computing device, completion of the second gesture at the presence-sensitive screen;
    responsive to detecting the completion of the second gesture, by the computing device, selecting the predicted completed string from the one or more predicted completed strings to output the combination of the predicted completed string for the input string and the terminator symbol.

12. The method of claim 10, wherein the hold time of the hold comprises a first hold time of the hold, the method further comprising:
    prior to outputting the graphical emphasis for the predicted completed string, outputting, by the computing device and for display at the presence-sensitive screen, a graphical emphasis for a first predicted completed string from the one or more predicted completed strings based at least on a second hold time of the hold that is less than the first hold time of the hold, the first predicted completed string being different than the predicted string.

13. The method of claim 10, wherein the presence-sensitive screen comprises a pressure-sensitive screen, the method further comprising:
    detecting, by the computing device, pressure applied to the pressure-sensitive screen,
    wherein outputting the graphical emphasis for the predicted completed string comprises outputting, by the computing device and for display at the presence-sensitive screen, the graphical emphasis for the predicted completed string based at least in part on the hold time of the hold and an amount of pressure applied to the pressure-sensitive screen.

14. The method of claim 10, further comprising:
   detecting, by the computing device, continued interaction for the hold at the presence-sensitive screen; and
   while the computing device continues to detect the continued interaction, graphically emphasizing, at the presence-sensitive screen, sequential ones of the predicted completed strings by filling, with an emphasis fill color and according to a sequential ordering, respective boxes surrounding the one or more predicted completed strings.

15. The method of claim 1, wherein the virtual key press gesture type is a "tap".

16. The method of claim 1, wherein the prediction completion gesture type is one of a "tap and flick" or a "swipe".

17. The method of claim 1, further comprising:
   outputting, by the computing device and for display at the region of the presence-sensitive screen that is associated with the terminator symbol, the predicted completed string.

18. A non-transitory computer-readable storage medium comprising instructions that, when executed, perform operations comprising:
   detecting, by a computing device, at a presence-sensitive screen of the computing device, a first gesture;
   determining, by the computing device and based on the first gesture, one or more characters of an input string;
   determining, by the computing device, one or more predicted completed strings for the input string;
   displaying the one or more predicted completed strings to the presence-sensitive screen;
   detecting, by the computing device, at a region of the presence-sensitive screen that is associated with a terminator symbol, a second gesture, the second gesture detected after the first gesture;
   determining, by the computing device, a type of the second gesture;
   responsive to determining that the type of the second gesture is a virtual key press gesture type, adding, by the computing device, the terminator symbol to the input string and outputting, by the computing device and for display at the presence-sensitive screen, the terminator symbol; and
   responsive to determining that the type of the second gesture is a prediction completion gesture type that is different than the virtual key press gesture type, outputting, by the computing device and for display at the presence-sensitive screen, a combination of a predicted completed string of one of the predicted completed strings and the terminator symbol.

19. A computing device, comprising:
   one or more processors;
   an input module executed by the processors to detect, at a presence-sensitive screen, a first gesture, wherein the input module determines, based on the first gesture, one or more characters of an input string, and wherein the input module determines one or more predicted completed strings for the input string;
   a display module executed by the processors to output, for display at the presence-sensitive screen, the predicted completed strings,
   wherein the input module detects, at a region of the presence-sensitive screen that is associated with a terminator symbol, a second gesture, the second gesture detected after the first gesture, and
   wherein the input module determines a type of the second gesture detected at the region of the presence-sensitive screen that is associated with the terminator symbol,
   wherein, responsive to determining that the type of the second gesture is a virtual key press gesture type, the input module adds the terminator symbol to the input string, and the display module outputs, for display at the presence-sensitive screen, the terminator symbol, and
   wherein, responsive to determining that the type of the second gesture is a prediction completion gesture type that is different than the virtual key press gesture type, the display module outputs, for display at the presence-sensitive screen, a combination of a predicted completed string of the predicted completed strings and the terminator symbol.

\* \* \* \* \*